(12) United States Patent
Teicholz et al.

(10) Patent No.: US 8,862,362 B2
(45) Date of Patent: Oct. 14, 2014

(54) SCHEDULING OF VARIABLE AREA FAN NOZZLE TO OPTIMIZE ENGINE PERFORMANCE

(75) Inventors: Matthew D. Teicholz, Mystic, CT (US); Paul H. Spiesman, Coventry, CT (US); Christopher J. Hanlon, Sturbridge, MA (US); John R. Gendron, Vernon, CT (US); Glenn D. Bartkowski, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 176 days.

(21) Appl. No.: 13/539,517

(22) Filed: Jul. 2, 2012

(65) Prior Publication Data

US 2014/0005910 A1    Jan. 2, 2014

(51) Int. Cl.
*G06F 19/00*      (2011.01)
*F02K 3/02*        (2006.01)

(52) U.S. Cl.
USPC .......................... 701/100; 60/226.3; 60/226.1

(58) Field of Classification Search
CPC ............... F02C 9/18; F02C 9/20; F02C 3/13; F02C 6/08; F02C 7/14; F02C 7/18; F02C 1/00; F02C 7/05; F02C 7/32; F02K 3/075; F02K 1/386; F02K 1/50; F02K 1/56; F02K 1/58; F02K 1/70

USPC .......... 701/3, 6, 10, 14–18, 36, 100; 60/226.3, 60/262, 231, 226.1, 226.2, 795
See application file for complete search history.

(56) References Cited

U.S. PATENT DOCUMENTS

| | | | |
|---|---|---|---|
| 6,901,739 | B2 | 6/2005 | Christopherson |
| 8,141,366 | B2 | 3/2012 | Zamora et al. |
| 2007/0214795 | A1 | 9/2007 | Cooker et al. |
| 2008/0273961 | A1* | 11/2008 | Rosenkrans et al. ............ 415/13 |
| 2009/0226303 | A1* | 9/2009 | Grabowski et al. ........... 415/151 |
| 2010/0011740 | A1 | 1/2010 | McVey |
| 2010/0050595 | A1 | 3/2010 | Migliaro, Jr. et al. |
| 2010/0068039 | A1 | 3/2010 | Winter |
| 2010/0218483 | A1 | 9/2010 | Smith |
| 2012/0023901 | A1 | 2/2012 | Gilson et al. |

* cited by examiner

*Primary Examiner* — Muhammad Shafi
(74) *Attorney, Agent, or Firm* — Carlson, Gaskey & Olds, P.C.

(57) ABSTRACT

A disclosed control system for a gas turbine engine includes a controller configured to set a position of the variable area fan nozzle according to a predetermined schedule of variable area fan nozzle positions corresponding to a flight operating condition. The schedule is determined in view of a relationship between a position of the variable area nozzle and a performance level of the engine at current flight conditions.

14 Claims, 5 Drawing Sheets

SCHEDULING OF VARIABLE AREA FAN NOZZLE TO OPTIMIZE ENGINE PERFORMANCE

BACKGROUND

A gas turbine engine typically includes a fan section and an engine core including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Commercial aircraft utilize high-bypass fan sections that generate a proportionally greater amount of thrust then the engine core from the bypass flow. In some high-bypass fan sections a fan variable area nozzle (VAFN or VAN) is installed at an end of the by-pass flow duct and regulate bypass flow by restricting nozzle area. Restriction in bypass flow by the VAN addresses particular conditions encountered during specific operation of the aircraft such as fan flutter during low power descents. Deployment and operation of a VAN involve compromises that provide improved propulsive efficiency and decreased service life. Although a VAN provides some performance benefits, engine designers and manufacturers are continually seeking additional ways to improve performance while also increasing engine service life.

SUMMARY

A control system for a gas turbine engine according to an exemplary embodiment of this disclosure, among other possible things includes a fan nacelle including variable area nozzle for regulating airflow through a bypass duct, an actuator coupled to the variable area nozzle for regulating air flow by positioning the variable area nozzle, and a controller configured to set a position of the variable area fan nozzle according to a predetermined schedule of variable area fan nozzle positions corresponding to a flight operating condition.

In a further embodiment of the foregoing control system, the predetermined schedule includes a plurality of variable area fan nozzle positions determined to produce a value of an engine performance parameter at the flight operating condition.

In a further embodiment of any of the foregoing control systems, the engine performance parameter comprises at least one of thrust and fuel consumption.

In a further embodiment of any of the foregoing control systems, the predetermined schedule includes a plurality of variable area fan nozzle position determined in view of an engine operating constraint.

In a further embodiment of any of the foregoing control systems, the engine operating constraints include at least one of a shaft speed, turbine temperature and bleed system condition.

In a further embodiment of any of the foregoing control systems, the flight operating condition comprises one of an aircraft speed, an engine speed and a bleed system demand.

In a further embodiment of any of the foregoing control systems, including operating the variable area fan nozzle according to the predetermined schedule of variable area fan nozzle positions at air speeds greater indicative of flight operations other than take-off and landing.

A method of defining a schedule of positions for a variable area fan nozzle of a gas turbine engine according to an exemplary embodiment of this disclosure, among other possible things includes constraining a characteristic of engine operation, defining a relationship between a position of the variable area nozzle and a performance level of the engine with the constrained engine operating characteristic, relating the position of the variable area nozzle for the performance level of the engine to a flight condition, defining a set of commands executable by a controller of the variable area fan nozzle for moving the variable area fan nozzle to the position related to the flight condition, and programming a controller to include the defined set of commands and to move the variable area fan nozzle to the position related to the performance level of the engine responsive to a flight condition.

In a further embodiment of the foregoing method, the flight condition includes at least one of an air speed, an engine speed and a bleed system condition and including moving the variable area fan nozzle to the defined position related to one of the air speed, engine speed and bleed system condition.

In a further embodiment of any of the foregoing methods, including step of defining a schedule of positions of the variable area fan nozzle that correspond with a plurality of values of the flight condition.

In a further embodiment of any of the foregoing methods, including the step of defining the schedule of positions of the variable area fan nozzle that correspond with the plurality of values of the flight condition for each of a plurality of engine operation constraints.

In a further embodiment of any of the foregoing methods, the plurality of engine operation constraints includes at least one of an engine speed, engine temperature and bleed system condition.

In a further embodiment of any of the foregoing methods, the performance level of the engine comprises a performance of the engine with regard to at least one of a thrust delivery and a fuel consumption.

In a further embodiment of any of the foregoing methods, the variable area fan nozzle includes at least one flap movable relative to a fixed nacelle portion and moving the variable area fan nozzle include moving the flap a distance from the fixed nacelle portion.

In a further embodiment of any of the foregoing methods, including defining a model representing responses of gas turbine engine operating characteristics relative to a position of a variable areas fan nozzle.

In a further embodiment of any of the foregoing methods, including defining a relationship with the model between an engine operating characteristic and a position of the variable area fan nozzle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
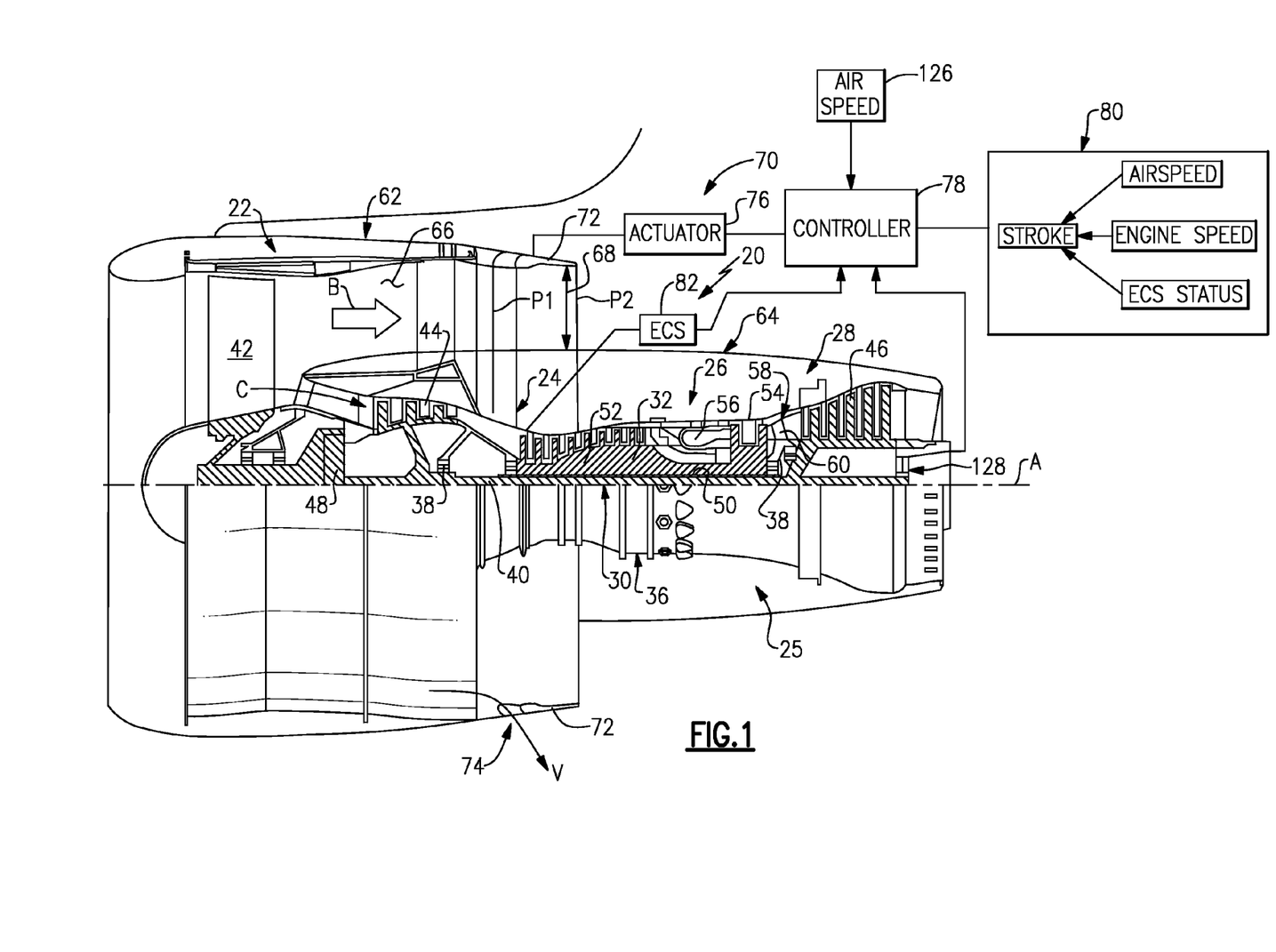
FIG. 1 is a schematic view of an example gas turbine engine.

FIG. 1 schematically illustrates an example gas turbine engine 20 that includes a fan section 22, and a core engine section 25 including a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R.)/518.7)^{0.5}]$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A fan nacelle 62 surrounds the fan section 22 and a core nacelle 64 surrounds the core engine section 25. An annular bypass passage 66 is defined between the fan nacelle 62 and the core nacelle 64. In the example engine 20, the nozzle exit area 68 is varied to alter the bypass flow B area with a variable area fan nozzle 70 (VAFN). The VAFN 70 includes flaps 72 near the exit area 68. The example flaps 72 are linearly moveable parallel to the axis A between a closed position P1 and an open position P2. The flaps 72 are also moveable between P1 and P2 in an infinite number of positions as is driven by actuator 76 controlled by controller 78.

The flaps 72 open to define a vent opening 74 through which a vent flow V passes. An open vent 74 increases the bypass flow B and effectively increases the nozzle exit area 68. With the flaps 72 in the first position P1, flow from the bypass flow path B is not permitted to pass through the vent 74 and therefore results in the smallest bypass flow passageway. Alternatively, when the flaps 72 are in the position P2, the bypass vent 74 is at a maximum position and the greatest amount of bypass flow B is allowed. The example controller 78 controls the actuator 76 and thereby the VAFN 70 to define the exit area 68 and optimize engine thrust and fuel consumption. Although a specific VAFN 70 configuration is disclosed by way of example other variable area nozzle configurations are within the contemplation of this disclosure and would benefit from the disclosures herein.

The controller 78 controls the actuator 76 to provide a desired stroke or opening size of the vent 74 in view of current flight operating conditions. The controller 78 controls the actuator 76 and therefore the stroke of the VAFN 70 dependent on a schedule of variable area nozzle positions schematically indicated at 80. In this example, the controller 78 sets the VAFN 70 dependent on at least one of airspeed 126, engine speed provided by a sensor 128 and a status of an environmental control system (ECS) 82. In this example the controller operates the VAFN 70 to provide the desired engine performance air speeds encountered outside of landing and takeoff conditions, for example at airspeeds greater than about 0.5 mach. It is further within the contemplation of this disclosure to operate the VAFN 70 during operational conditions encountered during flight conditions at speeds other than about 0.5 mach.

The ECS 82 draws air from a portion of the engine for use in conditioning an environment within the aircraft. In this example, the ECS 82 draws or bleeds air from the compressor section 24. Accordingly, the ECS 82 creates a bleed air demand on the gas turbine engine 20 that is considered in defining the schedule of VAFN positions 80.

The example area fan nozzle 70 is positioned during aircraft operation dependent on aircraft operating conditions defined in the schedule 80 to optimize engine thrust and fuel consumption. In this example the controller 78 is provided with air speed 126, engine shaft speed 126, and a condition of the bleed air demand of the ECS 82. A relationship between the sensed aircraft operating conditions, engine operating constraints and the VAFN 70 position is utilized to define the schedule 80.

The schedule 80 may include one or more data tables stored in the controller 78. The schedule 80 includes information relating the air speed, engine speed, bleed state and the desired position of the VAFN 70 for many detected conditions and/or combination of conditions.

Figure 2:
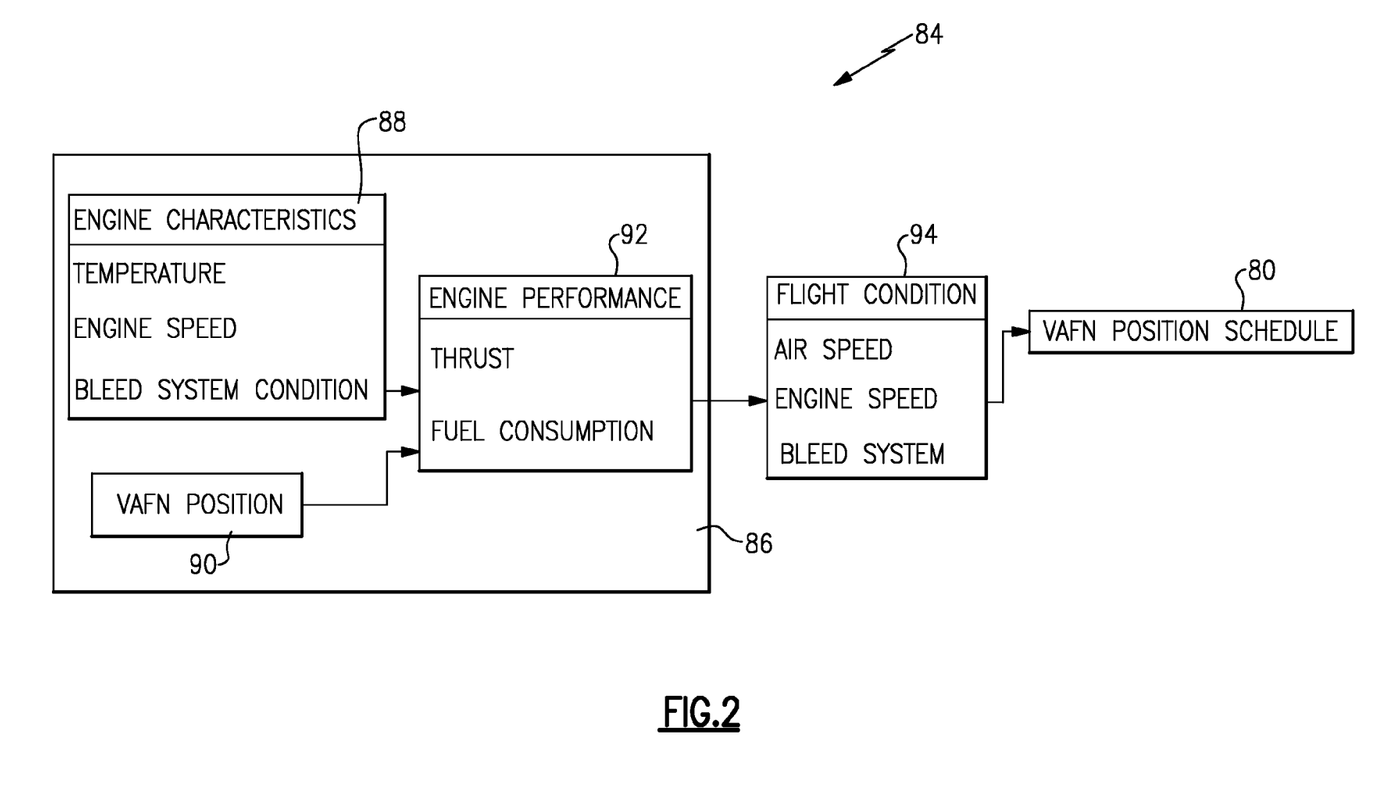
FIG. 2 is a schematic representation of a method of defining a schedule for positioning a variable area fan nozzle of a gas turbine engine.

Referring to FIG. 2 with continued reference to FIG. 1, determination of the example schedule 80 is schematically illustrated at 84 and utilizes a model 86 to simulate specific performance characteristics of the gas turbine engine 20. The schedule 80 is defined by setting engine constraints indicated at 88. The engine constraints 88 such as temperature of the turbine section 28 define a limit and/or range of target engine operating characteristics that provide desired thrust and fuel consumption. In this example, engine temperature, speed and bleed demand from the ECS 82 are considered although other engine operating parameters could be utilized to define a desired range of engine operation.

The engine temperature can be from any part of the engine that represents a constraint on engine operation such as for example a temperature within the high pressure compressor 52 or high pressure turbine 54. Moreover, the term engine speed refers to the speed of the low pressure turbine 46 and thereby the inner shaft 40. Other engine speeds that are indicative of defined engine limits may also be utilized to define desired engine operation and are within the contemplation of this disclosure.

A model 86 is used to simulate and characterize engine operation within the desired engine constraints 88 for different VAFN positions indicated at 90 that provide desired engine performance outputs as indicated at 92. In this example, the engine characteristics 88 are related to a position of the VAFN 90 that provides the desired level of engine performance 92.

Figure 3:
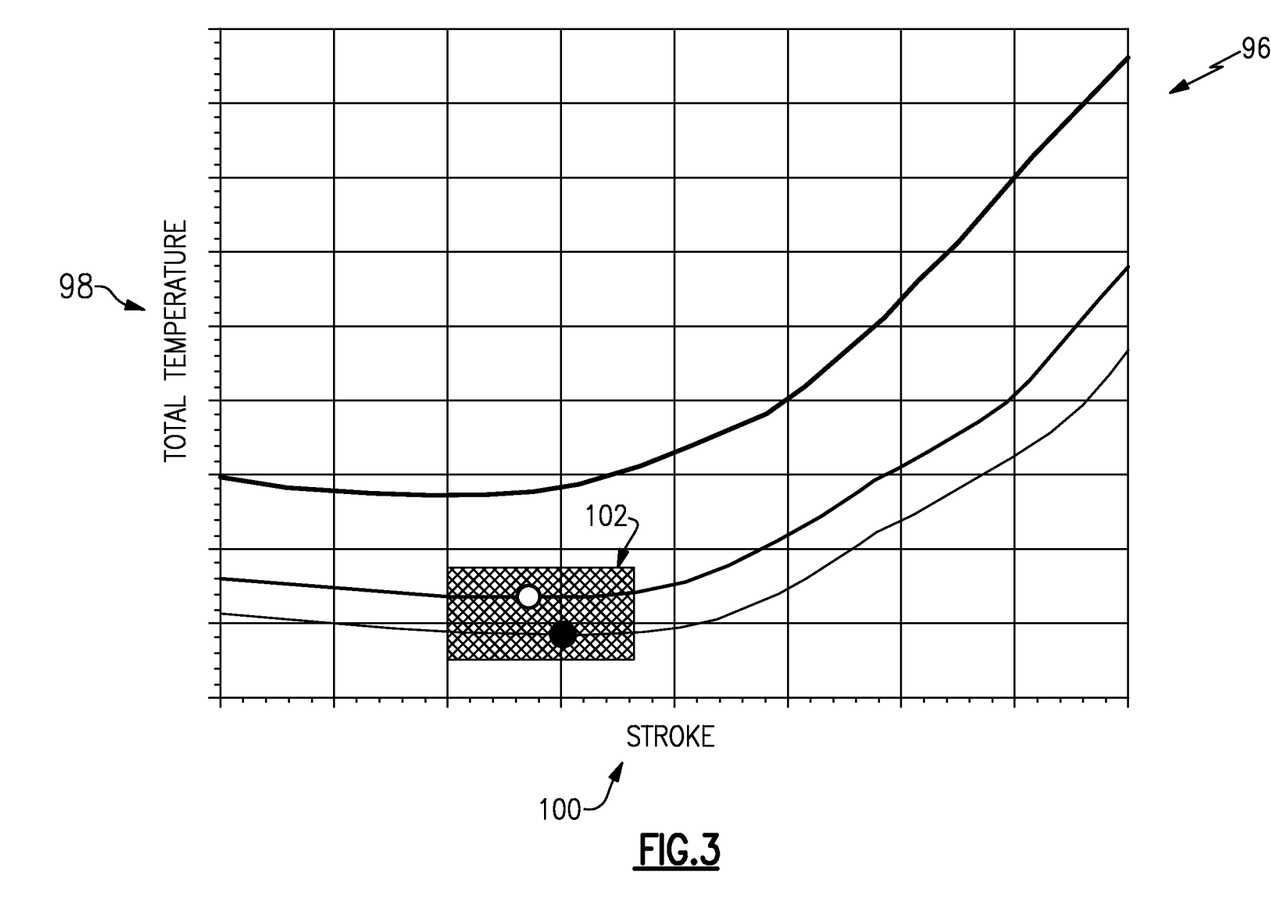
FIG. 3 is a graph illustrating a relationship between variable VAFN stroke and temperature.

Referring to FIG. 3, with continued reference to FIG. 2, a graph 96 provides a relationship between variable area fan nozzle stroke 100 and total temperature 98. As appreciated, an optimal region of the stroke indicated at 102 is defined for specific operating parameters of the engine 20. In this example, the optimum range is indicated at 102 to maintain the engine temperature 98 within a desired rang.

Figure 4:
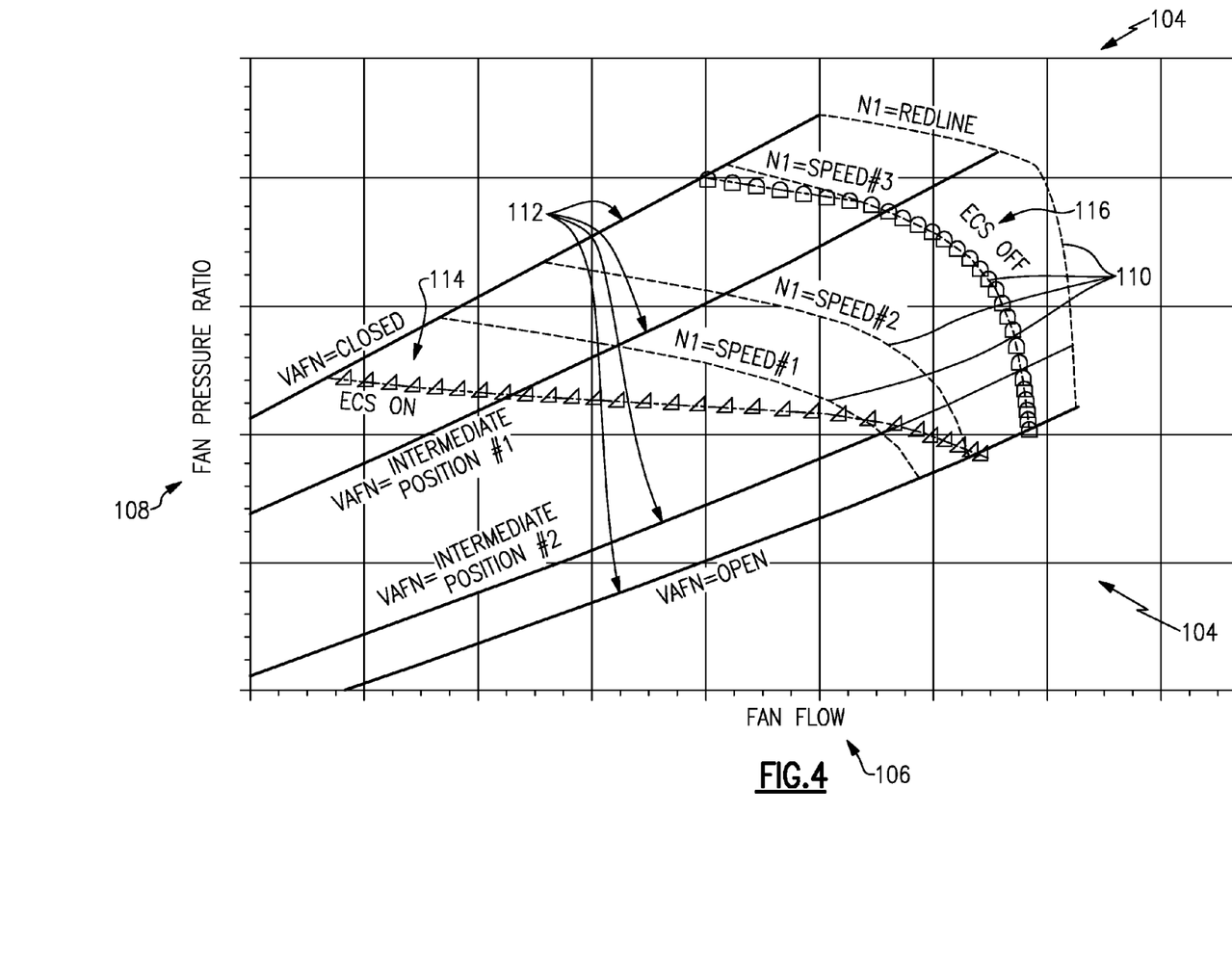
FIG. 4 is a schematic illustration of a relationship between fan flow and fan pressure.

Referring to FIG. 4 with continued reference to FIG. 2, a schematic representation 104 of fan flow 106 to fan pressure ratio 108 is illustrated. In this representation, the fan flow 106 is illustrated with respect to fan pressure ratio 108 and specific VAFN strokes 112. As appreciated, other elements affect engine operation and are considered in the schematic representation 104.

The amount of bleed air demand into the ECS 82 affects the amount of air that is supplied through the core engine 25 and therefore affects the fan pressure ratio 108 and a temperature within the engine 20. In this example, a first line is indicated at 114 with the ECS 82 on and thereby drawing bleed air away from the core engine 25. Engine speed is also characterized in this chart and indicated at 110. At each engine speed 110 the intersection between fan flow 106, VAFN stroke 112 and temperature changes depending on whether or not the ECS 82 is on and drawing bleed air or not. With the ECS off as indicated at 116, the maximum temperature is moved outwardly such that fan flow 106 may be increased relative to the fan pressure ratio 108 for a given VAFN stroke 112. Moreover, with the ECS 82 on as indicated at 114, the fan flow 106 is reduced and provides a more linear relationship over the full stroke of the VAFN 70.

Figure 5:
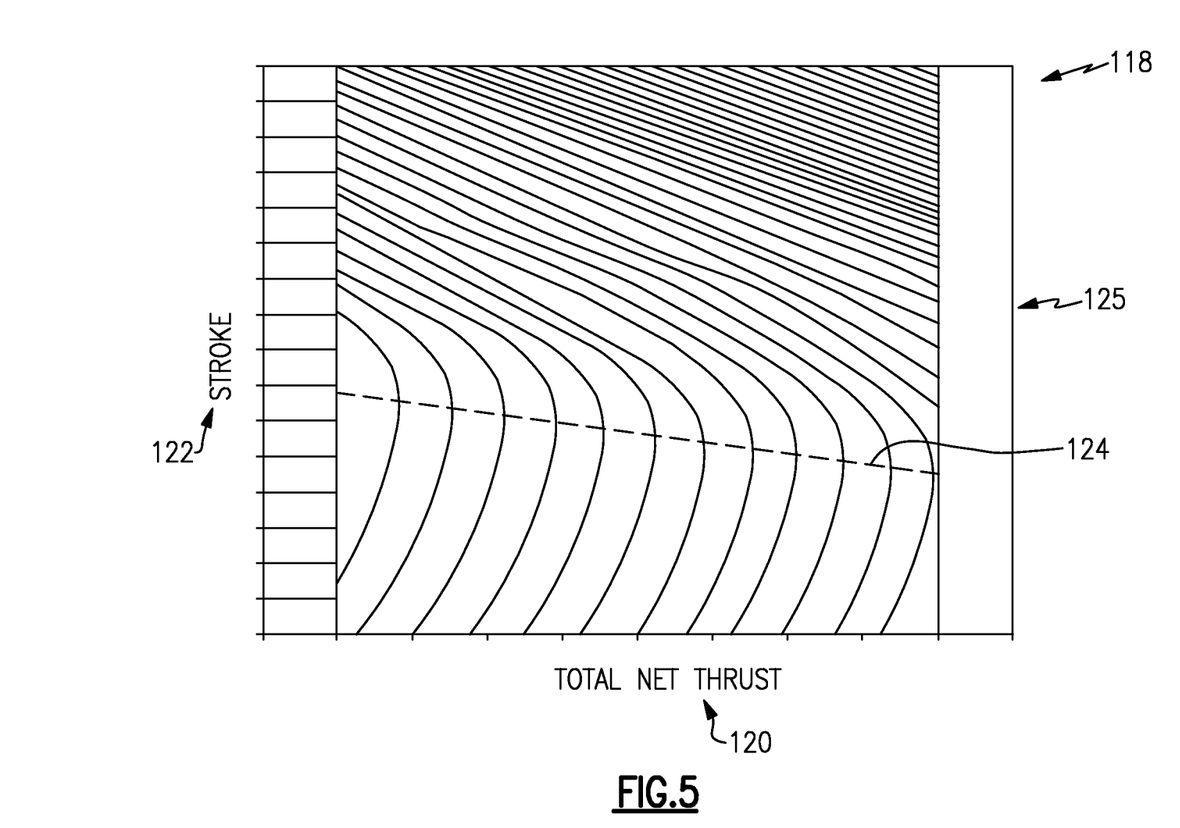
FIG. 5 is a graph illustrating a relationship between thrust and stroke as it relates to temperature.

Referring to FIG. 5 with continued reference to FIG. 2, another example relationship is schematically indicated at 118 and relates total thrust 120 to stroke 122 for a given temperature 125. In this example, line 124 represents a desired temperature for operation of the engine 20. Accordingly, the VAFN stroke 122 is altered to maximize thrust 120 while maintaining the temperature 125 along the line 124.

The information illustrated in FIGS. 3, 4 and 5 is utilized by the model 86 simulate and predict engine performance and define the VAFN schedule 80. The resulting relationship between engine characteristics, VAFN position 90 and engine performance 92 are then determined for different flight conditions as indicated at 94. Once the specific flight condition 94 is matched with the engine performance 92 and VAFN position 90, the schedule 80 defines a specific stroke or VAFN position 90 in view of the aircraft flight condition 94 such as air speed 126, engine speed 128 and if the ECS 82 is drawing bleed air.

In operation, the controller 78 references the schedule 80 and receives information indicative of current flight conditions to determine VAFN 70 position to optimize thrust and/or fuel consumption while also maintaining operation of the engine 20 within acceptable performance parameters. Accordingly, in this example, the controller 78 adjusts the variable area fan nozzle 70 to maintain the engine 20 within the desired temperature and speed ranges, while optimizing thrust and fuel consumption. It should be understood that although specific performance characteristics and values are described by way of example, other engine performance values and criteria may also be utilized to generate the schedule and provide guidance for defining the position of the VAFN 70 to improve engine performance.

It should be understood, that the method of system design for operating the VAFN 70 is performed utilizing the controller 78 that may be an independent controller or part of a larger engine or aircraft controller. In terms of hardware architecture, the controller 78 can include a processor, a memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM), such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller 78 is in operation, the processor can be configured to execute software stored within the memory, to communicate data to and from the memory, and to generally control operations of the controller 78 pursuant to the software. Software in memory, in whole or in part, is read by the processor, perhaps buffered within the processor, and then executed.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A control system for a gas turbine engine comprising:
   a fan nacelle including variable area nozzle for regulating airflow through a bypass duct;
   an actuator coupled to the variable area nozzle for regulating air flow by positioning the variable area nozzle; and
   a controller configured to set a position of the variable area fan nozzle according to a predetermined schedule of variable area fan nozzle positions corresponding to a flight operating condition, wherein the flight operating condition includes an amount of bleed air demand into an environmental control system within an aircraft, wherein the predetermined schedule includes a plurality of variable area fan nozzle positions determined to produce a value of an engine performance parameter at the flight operating condition.

2. The control system as recited in claim 1, wherein the engine performance parameter comprises at least one of thrust and fuel consumption.

3. The control system as recited in claim 1, wherein predetermined schedule includes a plurality of variable area fan nozzle position determined in view of an engine operating constraint.

4. The control system as recited in claim 3, wherein the engine operating constraints include at least one of a shaft speed, turbine temperature and bleed system condition.

5. The control system as recited in claim 1, wherein the flight operating condition comprises one of an aircraft speed, an engine speed and a bleed system demand.

6. The control system as recited in claim 5, including operating the variable area fan nozzle according to the predetermined schedule of variable area fan nozzle positions at air speeds greater indicative of flight operations other than take-off and landing.

7. A method of defining a schedule of positions for a variable area fan nozzle of a gas turbine engine by a controller, the method comprising:
   constraining a characteristic of engine operation;
   defining a relationship between a position of the variable area nozzle and a performance level of the engine with the constrained engine operating characteristic, wherein the constrained engine operating characteristic includes an amount of bleed air demand from an environmental control system of an aircraft;
   relating the position of the variable area nozzle for the performance level of the engine to a flight condition;

defining a set of commands executable by a controller of the variable area fan nozzle for moving the variable area fan nozzle to the position related to the flight condition; programming a controller to include the defined set of commands and to move the variable area fan nozzle to the position related to the performance level of the engine responsive to a flight condition; and defining a schedule of positions of the variable area fan nozzle that correspond with a plurality of values of the flight condition.

8. The method as recited in claim 7, wherein the flight condition includes at least one of an air speed, an engine speed and a bleed system condition and including moving the variable area fan nozzle to the defined position related to one of the air speed, engine speed and bleed system condition.

9. The method as recited in claim 7, including the step of defining the schedule of positions of the variable area fan nozzle that correspond with the plurality of values of the flight condition for each of a plurality of engine operation constraints.

10. The method as recited in claim 9, wherein the plurality of engine operation constraints includes at least one of an engine speed, engine temperature and bleed system condition.

11. The method as recited in claim 7, wherein the performance level of the engine comprises a performance of the engine with regard to at least one of a thrust delivery and a fuel consumption.

12. The method as recited in claim 7, wherein the variable area fan nozzle includes at least one flap movable relative to a fixed nacelle portion and moving the variable area fan nozzle include moving the flap a distance from the fixed nacelle portion.

13. The method as recited in claim 7, including defining a model representing responses of gas turbine engine operating characteristics relative to a position of a variable areas fan nozzle.

14. The method as recited in claim 13, including defining a relationship with the model between an engine operating characteristic and a position of the variable area fan nozzle.

* * * * *